United States Patent
Gong

(10) Patent No.: US 6,243,089 B1
(45) Date of Patent: *Jun. 5, 2001

(54) WEB BROWSER DISPLAY INDICATOR SIGNALING THAT CURRENTLY DISPLAYED WEB PAGE NEEDS TO BE RELOADED

(75) Inventor: Qing Gong, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/109,256

(22) Filed: Jun. 30, 1998

Related U.S. Application Data

(63) Continuation of application No. 08/684,865, filed on Jul. 25, 1996, now Pat. No. 5,821,927.

(51) Int. Cl.[7] .................................................. G06F 13/14
(52) U.S. Cl. .............................................................. 345/335
(58) Field of Search ............................ 345/335; 707/203, 707/201, 206, 207, 218, 219

(56) References Cited

U.S. PATENT DOCUMENTS 5,842,216 * 11/1998 Anderson et al. .................. 707/203

OTHER PUBLICATIONS

Computer Networks and ISDN Systems, H. Shrikumar, Thinternet: life at the end of a tether, 1994, pp 375–385.

$Id: index.html, v1.4, Feb. 26, 1996, Martin Samilton, Other Frequently Asked Questions about WWW Caching, pp 1–7.

* cited by examiner

*Primary Examiner*—Mark Zimmerman
*Assistant Examiner*—Cliff Vo
(74) *Attorney, Agent, or Firm*—Richard A. Tomlin; Robert Lieber

(57) ABSTRACT

Network browser applications are improved by providing visual status indications informing users that currently displayed pages are one of: old (outdated), partly old or new. Conventional browser applications load old or partly old page information from a cache and new information from a (usually remote) server to which the browser links via a network. A user expecting to view only new information (e.g. information that might be useless if out of date) is alerted by present status indications to request the browser to reload the entire page; which the user can do by operating a reload selector/icon conventionally presented by the browser. Various alternative status indications are shown, along with potential associations of such with a reload selector button (or equivalent icon).

7 Claims, 1 Drawing Sheet

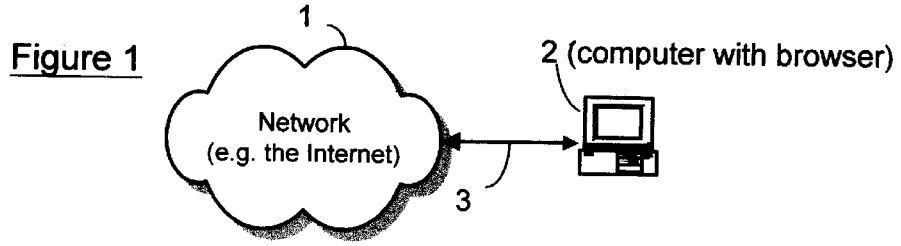
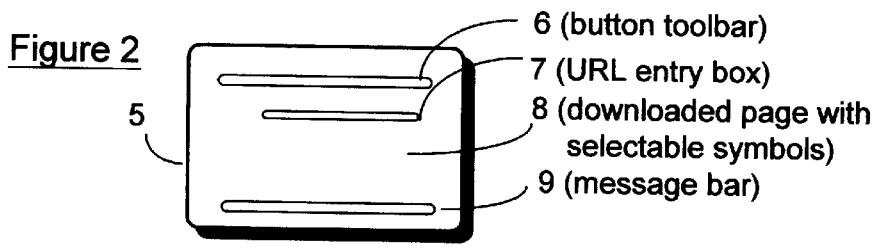
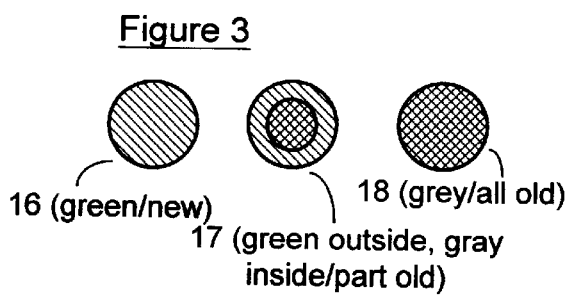
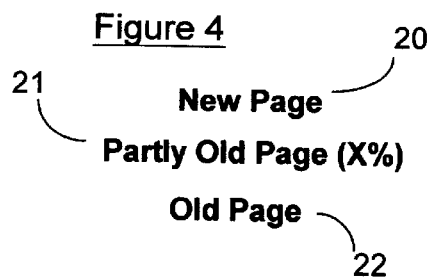
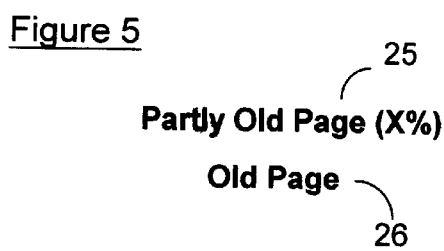
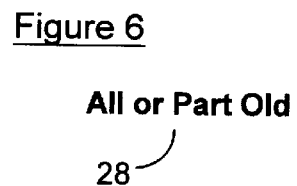
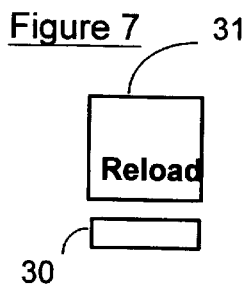
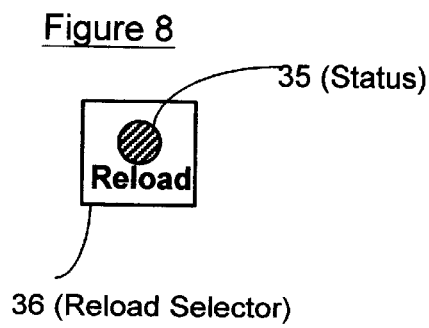

WEB BROWSER DISPLAY INDICATOR SIGNALING THAT CURRENTLY DISPLAYED WEB PAGE NEEDS TO BE RELOADED

This is a continuation under 37 CFR 1.53(b) of parent patent application Ser. No. 08/684,865 filed Jul. 25, 1996 is now U.S. Pat No. 5,821,927. The disclosure of that parent application is hereby incorporated herein by reference.

BACKGROUND OF THE INVENTION

This invention pertains to network browsers, with particular application to browsers commonly used on the Internet and World Wide Web.

Web browsers in use today display information to their users in discrete pages that are downloaded from a (usually remote) network server. Each downloaded page usually is cached in a local hard file. Visible links enable the user to request access to a previously displayed page. In order to speed up operations and avoid unnecessary network communications, a browser receiving a request for a previously displayed page, usually retrieves that page either entirely from cache, or partly from cache and partly from the originating network server. Partial retrieval via the network usually occurs automatically (i.e. without explicit user request) when a requested page contains information requiring interaction between the browser and the originating server.

A problem related to this cached handling of page information is that an inexperienced user may be unaware that a page currently being redisplayed contains "old" information (i.e. information retrieved from cache), when the user expects to see only "new" information; expected, for instance, when the information is susceptible of changing somewhat frequently, such as product information in an advertiser's "home" page. Although browsers generally provide a "reload" selector (e.g. a function selectable on the display screen, such as a menu item, icon or button), the inexperienced user requiring new information may not realize that he or she is viewing old information, and therefore fail to explicitly request reloading of the respective page. Also, the inexperienced user may be unaware of the reload function and/or its use. Consequently, information in a re-displayed page could be mis-interpreted by the user, with resulting degradation of productivity of the user per se and their computer equipment.

The present invention seeks to provide a solution to this problem.

SUMMARY OF THE INVENTION

In accordance with the present invention, viewable status indications are provided on the browser display screen containing the page currently being viewed. In a preferred embodiment, these indications differentiate information currently being viewed as entirely new, at least partly old, or entirely old.

In one embodiment, these indications are presented as icons illuminated in different colors that distinguish between new, old and partially old. In another embodiment, the indications appear as illuminated text denoting new, old and partially old status.

In variations of these embodiments, the indications are reduced in size to occupy less of the currently available display screen space. The reduction is accomplished by either completely eliminating the "new" status indication or both the "new" and completely "old" status indications. In the latter usage, a single status indication is illuminated to indicate either "partly old" or "old" (e.g. by blanking or turning off highlighting on the word "partly").

In another variation, the status indications are positioned adjacent a graphic symbol representing a "reload" selection button, for associating the two. The reload selection button is selectable by a user (e.g. by "clicking" on it with a pointing device such as a mouse) to effect reloading of the currently viewed page from a remote network server containing the most up-to-date version of the page. In yet another variation, a status icon is incorporated into the reload selection button, to indicate that data in a currently viewed page is old or at least partially old and to make selection of the reload function a natural extension of that status indication.

The foregoing and other features, advantages, uses and advantages of this invention will be more fully understood and appreciated by considering the following description and claims.

BRIEF DESCRIPTION OF THE DRAWINGS

FIG. 1 is a schematic of a network environment in which the present invention is useful.

FIG. 2 suggests the format of a typical page displayed by one commonly used browser.

FIG. 3 suggests present status indications having the form of selectively illuminated icons with colors distinguishing the currently displayed page as entirely new, partly old, or entirely old.

FIG. 4 suggests present status indications having the form of selectively illuminatable text distinguishing the currently displayed page as entirely new, partly old, or entirely old.

FIG. 5 suggests an alternate text formatted status indication using text characters than the indication of FIG. 4.

FIG. 6 suggests another alternate text formatted status indication using fewer characters than either FIG. 4 or FIG. 5.

FIG. 7 suggests positioning the present status indication adjacent a graphic icon/button, the latter marked as a selection link for reloading a currently viewed page.

FIG. 8 suggests placement of a status indicating icon inside a button icon representing a presently conventional reload selector.

DETAILED DESCRIPTION

1. Problem Solved

The problem solved presently is explained with reference to a typical network environment shown in FIG. 1. Network 1 is used by multiple computers, one of the latter suggested at 2, via communication links shown at 3. The computers have network browsing program applications (hereafter, termed "browsers") which enable their users to quickly locate and view information contained in displayable pages. Information contained in these pages generally originates at server stations that are remote from respective user computers.

Users of contemporary browsers, for instance the Netscape Navigator™ (trademark of Netscape Corporation), have the experience that page information currently displayed may be out-of-date although the user expects such information to be always up-to-date. The reason, generally unbeknownst to inexperienced users, is that their browser caches page information in order to provide faster responses to their requests. However, this creates a problem if a displayed page contains information that changes at the origin server without requiring automatic interaction between the user's browser and the origin server whenever the information is redisplayed to the user. For example, product information contained in an advertiser's "home" page may change in this manner.

Inexperienced users generally tend to either ignore or be unaware of origins of what they are viewing and fail to request reloading of transient information; although many browsers (including Netscape Navigator) have a reload function that can be manually triggered by their users (e.g. via a selectable icon shown graphically as a button labelled "Reload").

This problem is complicated presently by the possibility that some of the current page information may be loaded partly from a server and partly from cache. For instance, where part of a page is a form completable by the viewer/user, information in that form may be accompanied by an "applet" used to control interaction between the user's computer and the remote origin server, and other information on the same page may subject to frequent change at the origin server. In that situation, the browser may retrieve the form and applet from cache and the other/changeable information from either cache or the origin server. So this type of practice can cause further confusion to users of the system.

The present invention seeks to eliminate this problem by providing users of network browsers with explicit indications of page status, such indications notifying users when information currently viewed is old or at least partly old.

2. Typical Browser Display Format

The status indications of the present invention are best understood by first considering the display screen format offered by a typical browser. This format is shown in FIG. 2, and represents the format used by the Netscape browser mentioned above.

Display screen 5 contains a number of discrete display areas shown at 6–9. Area 6 is a "toolbar" displaying buttons that are selectable by operation of ("clicking on") a switch on a pointing device when a cursor positioned by that device overlies respective buttons. In the illustrated arrangement, toolbar 6 contains a not-shown "Reload" button that when selected causes the browser to request reloading of the page currently being viewed (from a remote origin server, via the network, etc.). Area 7 is a space for the user to enter URL (universal resource locator) information representing an address of a remote page (if such address is known by the user). Area 8 contains the body of page information that is currently viewable. Area 9 is a message bar in which the browser displays messages indicating what actions are currently in process relative to the network.

Although the not-shown Reload button on toolbar bar 6 is explicitly labelled "Reload", its function and/or appropriate occasions for its use may not be understood by an inexperienced user; inasmuch as such users generally has no indication that such reloading is either required or desirable. The present invention, as described next, provides such indication.

3. Preferred Embodiments and Variations

As noted above, my invention provides users of network browsers with explicit status indications for alerting them to possible need for requesting page reload action; i.e. operation of respective reload selector buttons (or equivalent icons).

Preferred embodiments of such status indications are suggested in FIGS. 3 and 4; potentially useful variations of these indications are suggested in FIGS. 5 and 6; and placement of these indications relative to a Reload selector button (or equivalent icon) are suggested in FIGS. 7 and 8.

Referring to FIG. 3, indications of page status can be provided via illumination of one of three displayed circular icons 16–18. When illuminated, icon 16 indicates that the content of the currently displayed page is entirely new, icon 17 indicates the respective content to be partly old, and icon 18 indicates the respective content to be entirely old. These icons when illuminated are distinctive. For example, as suggested in the illustration, icon 16 could be a single green circle, icon 17 could contain concentric outer and inner circles respectively appearing as green and gray, and icon 18 could be a single gray circle. One obvious alternative for displaying these three icons would be to display them all in a single circular area of the display screen with their respective colors or other distinctions chosen by the browser application.

FIG. 4 shows that the three status indications can be presented as illuminated words 20, 21 and 22 respectively indicating the current page to be all new, partly old, or all old. As shown at 21, the partly old indication can include a percentage figure indicating how much of the page is old. Just as noted above for FIG. 3, the verbal indications of FIG. 4 can all be traced on (presented in) a single screen location.

FIG. 5 shows that two status indications 25 and 26 might be sufficient, one (indication 25) presented when the current page is partly old and the other (26) when the page is entirely old. Then the absence of either indication implicitly connotes that the current page is new.

FIG. 6 shows that the two status indications of FIG. 5 might be combinable into a single indication 28 suggesting that the current page is "all or part old", or equivalently that the current page is "at least part old". Alternatively, the indication 28 can be selectively illuminated to appear as either "all old" or "part old".

It should be appreciated that indications equivalent to those shown in FIGS. 5 and 6 could be effected with circular or other icons. For example, a single circular icon could be illuminated red, to give an entirely "old" indication equivalent to item 26 in FIG. 5 or part of item 28 in FIG. 6, and replaced with a red outer circle containing a yellow inner circle to indicate "partly old" status. In the latter usage, the diameter of the inner circle could be varied to inversely suggest the percentage of new and old matter in the current page (i.e. the remaining amount of the outer circle would directly indicate the proportion of old matter, rising from 0 to 100% as the inner circle grows smaller in size from a configuration almost entirely overlying the outer circle to where the inner circle vanishes completely).

FIG. 7 shows that present status indication(s) 30 can be displayed close to the "Reload" selection button 31, so that a user would tend to associate the two. FIG. 8 carries this a step farther, suggesting the two functions be combined into a single composite graphic; e.g. a circular status indication (or one of two or three indications) 35 within a Reload button selector 36.

Those skilled in presently relevant arts should appreciate that the status indications of my invention can be incorporated into browser application programs, and that such programs are installable into network computers from various computer-readable media; the latter including hard disks, diskettes, CD-ROM's, communication links to remote network servers, etc.

The foregoing and other variations and aspects of this invention will be further appreciated from the following claims.

What is claimed is:

1. Computer browser apparatus for a user of a data communication network having servers remote from said apparatus comprising:

means for displaying a page of information downloaded to said apparatus from a said remote server;

reload means for enabling said user to interact with said apparatus and request refreshing from said remote server of a said downloaded page that is currently being displayed; and means for displaying a status indication to said user, said status indication informing said user that at least part of said page currently being displayed is old and potentially outdated; said status indication serving as a cue to prompt said user to use said reload means to have said page currently being displayed refreshed from said remote server; and wherein:

said displayed status indication comprises at least one graphically drawn status icon having an appearance effectively distinguishing the respective page contents as one of: all new, all old, and partly new and partly old.

2. Apparatus according to claim 1 wherein said status icon is a circle having a distinctive color corresponding to one of all new, all old, and partly new and partly old.

3. Apparatus according to claim 2 wherein said status icon is manifested by a pair of concentric circles having relatively distinct sizes and colors distinguishing the respective page contents as one of all new, all old, and partly new and partly old.

4. Apparatus according to claim 1 wherein said status indication consists of one of two graphic figures explicitly distinguishing the respective page contents as one of all old or partly old; and said all new indication is effectively implied by the absence of either of said two graphic figures.

5. Computer browser apparatus for a user of a data communication network having servers remote from said apparatus comprising:

means for displaying a page of information downloaded to said apparatus from a said remote server;

reload means for enabling said user to interact with said apparatus and request refreshing from said remote server of a said downloaded page that is currently being displayed; and means for displaying a status indication to said user, said status indication informing said user that at least part of said page currently being displayed is old and potentially outdated; said status indication serving as a cue to prompt said user to use said reload means to have said page currently being displayed refreshed from said remote server; and wherein:

said displayed status indication is arranged in the form of a set of displayed words effectively distinguishing the contents of the respective page as one of: all new, all old, and partly new and partly old.

6. Computer browser apparatus for a user of a data communication network having servers remote from said apparatus comprising:

means for displaying a page of information downloaded to said apparatus from a said remote server;

reload means for enabling said user to interact with said apparatus and request refreshing from said remote server of a said downloaded page that is currently being displayed; and means for displaying a status indication to said user, said status indication informing said user that at least part of said page currently being displayed is old and potentially outdated; said status indication serving as a cue to prompt said user to use said reload means to have said page currently being displayed refreshed from said remote server; and wherein:

said reload means includes a displayed reload indicator that is selectable by operation of a pointing device; and said status indication is displayed close to said reload indicator.

7. Computer browser apparatus for a user of a data communication network having servers remote from said apparatus comprising:

means for displaying a page of information downloaded to said apparatus from a said remote server;

reload means for enabling said user to interact with said apparatus and request refreshing from said remote server of a said downloaded page that is currently being displayed; and means for displaying a status indication to said user, said status indication informing said user that at least part of said page currently being displayed is old and potentially outdated; said status indication serving as a cue to prompt said user to use said reload means to have said page currently being displayed refreshed from said remote server; and wherein:

said reload means includes a displayed reload indicator that is selectable by operation of a pointing device; and said displayed status indication overlies said reload indicator so that said reload indicator and status indication appear to said user as a single composite indication.

* * * * *